(12) United States Patent
Bien et al.

(10) Patent No.: US 12,393,598 B2
(45) Date of Patent: Aug. 19, 2025

(54) AUTOMATIC SLICE DISCOVERY AND SLICE TUNING FOR DATA MINING IN AUTONOMOUS SYSTEMS

(71) Applicant: GM CRUISE HOLDINGS LLC, San Francisco, CA (US)

(72) Inventors: Nicholas Bien, New York, NY (US); Yunjie Zhao, San Francisco, CA (US); Matthew Elkherj, Belmont, CA (US); Pratik Prabhanjan Brahma, Santa Clara, CA (US); Zehao Hu, Redwood City, CA (US); Or Cohen, San Francisco, CA (US); Jason Lwin, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 18/403,210

(22) Filed: Jan. 3, 2024

(65) Prior Publication Data
US 2025/0217375 A1 Jul. 3, 2025

(51) Int. Cl.
G06F 16/24 (2019.01)
G06F 16/2458 (2019.01)

(52) U.S. Cl.
CPC ............................... *G06F 16/2465* (2019.01)

(58) Field of Classification Search
CPC .................................................. G06F 16/2465
See application file for complete search history.

(56) References Cited

U.S. PATENT DOCUMENTS

| | | | | |
|---|---|---|---|---|
| 10,992,396 B1 * | 4/2021 | Nahata | ................ | H04B 17/104 |
| 10,997,429 B2 * | 5/2021 | Golov | .................... | G06V 20/56 |
| 2019/0120640 A1 * | 4/2019 | Ho | ..................... | G01C 21/3453 |
| 2023/0049567 A1 * | 2/2023 | Popov | ..................... | G06N 7/01 |
| 2023/0102048 A1 * | 3/2023 | Cella | ....................... | B25J 9/1661 |
| | | | | 700/248 |
| 2024/0135160 A1 * | 4/2024 | Piazentin Ono | ......... | G06N 3/08 |
| 2024/0416949 A1 * | 12/2024 | Barrera | ................ | B60W 30/16 |

\* cited by examiner

*Primary Examiner* — Merilyn P Nguyen
(74) *Attorney, Agent, or Firm* — CANTOR COLBURN LLP

(57) ABSTRACT

Disclosed are embodiments for facilitating automatic slice discovery and slice tuning for data mining in autonomous systems. In some aspects, an embodiment includes providing, by a processing device hosting a slice discovery machine learning (ML) model, input data to the slice discovery ML model, the input data corresponding to performance data of an autonomous vehicle (AV); identifying, by the slice discovery ML model, attributes of the AV and corresponding thresholds for the attributes that define a slice comprising a collection of data sharing common characteristics; and providing, by the slice discovery ML model, the attributes and the corresponding thresholds defining the slice to a slice miner to mine training data corresponding to the slice for a tailored dataset.

20 Claims, 8 Drawing Sheets

400

---

Receive metric data corresponding to performance of an autonomous vehicle (AV) machine learning (ML) model
410

---

Input AV ML model feature space data corresponding to the metric data to a model performance-based automatic slice discovery ML model
420

---

Process the AV ML model feature space data at the model performance-based automatic slice discovery ML model to identify sources of errors in the AV ML model
430

---

Generate, by the model performance-based automatic slice discovery ML model, a set of attributes and corresponding thresholds for the attributes to define a slice in which the sources of errors occur
440

---

Provide the set of attributes and corresponding thresholds defining the slice to a slice miner to mine additional data corresponding to the slice for a tailored dataset for training and/or evaluation of the AV ML model
450

FIG. 4

AUTOMATIC SLICE DISCOVERY AND SLICE TUNING FOR DATA MINING IN AUTONOMOUS SYSTEMS

BACKGROUND

1. Technical Field

The disclosure generally relates to the field of processing systems and, more specifically, to automatic slice discovery and slice tuning for data mining in autonomous systems.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 4 illustrates an example method implementing model performance-based automatic slice discovery for data mining in autonomous systems, in accordance with embodiments herein;

DETAILED DESCRIPTION

Figure 1:
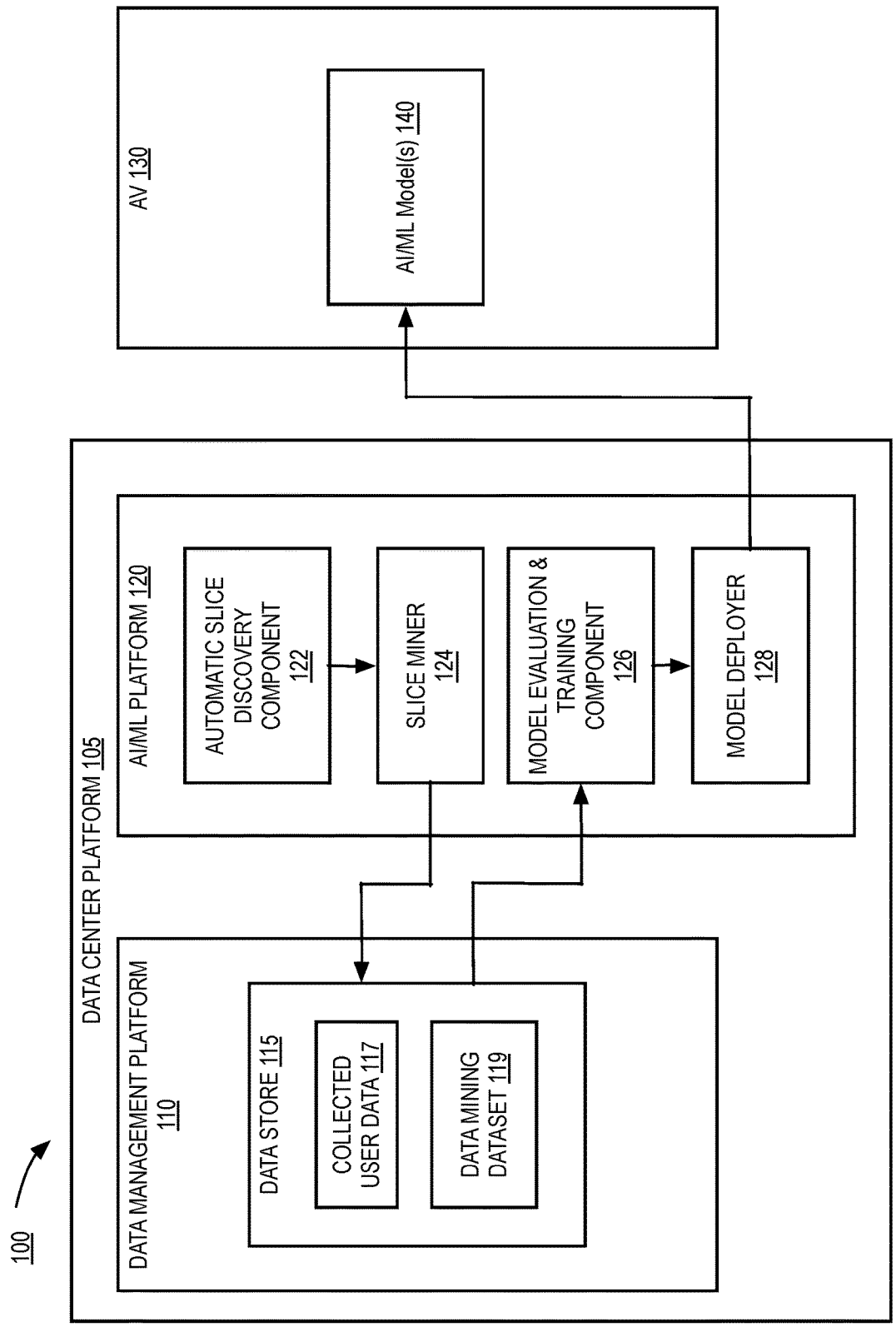
FIG. 1 is a block diagram illustrating an example system for automatic slice discovery and slice tuning for data mining in autonomous systems, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can utilize one or more trained machine learning (ML)-based models that autonomously control and/or operate the vehicle. The trained model(s) can utilize the data and measurements captured by the sensors of the AV to identify, classify, and/or track objects (e.g., vehicles, people, stationary objects, structures, animals, etc.) within the AV's environment. The model(s) utilized by the AV may be trained using any of various suitable types of learning, such as deep learning (also known as deep structured learning). Deep learning is part of a broader family of machine learning methods based on artificial neural networks with representation learning. The learning can be supervised, semi-supervised, or unsupervised, and may be trained using real-world image data and/or image data generated in a simulated environment that have been labeled according to "correct" outputs of one or more perception functions (e.g., segmentation, classification, and/or tracking) of the AV.

Generating a robust and accurate training data set for training ML-based models can directly impact the effectiveness and accuracy of those trained models when utilized in the AV. One aspect of generating a robust and accurate training data set is being able to identify and include in the training data set targeted cases that can address weaknesses of the ML models. Data mining techniques can be utilized to identify those targeted cases. Data mining is a term used to describe the process of sorting through large data sets to identify data having certain characteristics. Slice mining is an approach in data mining of adding a tailored dataset to training of ML models. This tailored dataset may consist of or otherwise comprise slices of the dataset. A slice refers to subsets of data having a similar set of determined attributes. In implementations herein, the attributes may include features and metrics corresponding to the AV and a context of the AV during operation. For example, the features and metrics can include road agent characteristics, contextual attributes, attributes with respect to the AV, prediction output, ground truth information, uncertainty, distance metrics, trajectory probability, yield/assert data, and so on. In an example, for categorical/binary attributes, multiple values could fit a criteria (e.g., pedestrian is on the sidewalk or the crosswalk), and for continuous attributes, thresholding could be utilized to define a range of values that meets the criteria for the slice (e.g., speed>5 and speed<10). A subset of these features/metrics can be combined to define a slice of the dataset.

Some approaches to data mining in autonomous system fields, such as in the field of slice mining for ML models deployed on AVs, may encounter problems. In some approaches, the process of data mining using slices based on events is done manually by reviewing an event or set of events, gaining some intuition about what attributes might be helpful to slice the data, then tuning thresholds on those attributes and checking coverage and density numbers. The step of choosing attributes to slice on is a manual process in these approaches. For example, a consistent failure mode may be observed for an ML model. One way to tackle this problem is to generate a corresponding data slice associated with the consistent failure mode and add it to the training data set. However, this is a labor-intensive effort to identify the slice, which can involve many interactions of attribute and threshold modifications, followed by a validation step including manual review of slice examples to confirm that the slice covers the failure mode of interest.

Embodiments herein address the above-noted problems experienced with data mining in autonomous systems by providing automatic slice discovery and slice tuning for data mining in autonomous systems. In one embodiment, automatic slice discovery is implemented using a variety of approaches. In one approach, event-based automatic slice discovery is implemented. In event-based automatic slice discovery, a target scene (event) is identified based on behavior of the AV during operation. The target scene may be provided as an incoming signal to a trained ML model providing slice discovery. The trained ML model for slice discovery may process the incoming signal of the target scene in order to generate the set of attributes and corresponding thresholds for the values of those attributes that can be utilized as a defined slice for slice mining. The trained ML model operates to identify the "event" occurring in the target scene and determine the set of attributes and thresholds used to define that event. The generated slice definition (attributes/thresholds) can then be used to query a larger dataset to identify other similar slices having that event for use in generating a tailored data set for use in training another ML model.

Another approach implemented by embodiments herein is model performance-based automatic slice discovery. In the model performance-based automatic slice discovery, internal metrics used to evaluate performance of ML models operating on the AV can be utilized to identify whether an anomaly is occurring with performance of the ML model. Such anomaly may not necessarily be reflected in the behavior of the AV, but nevertheless affect the ML model performance. Model performance-based automatic slice discovery utilizes a trained ML model for slice discovery to predict errors in ML models and identify sets of attributes and thresholds associated with those predicted errors. Those sets of attributes/thresholds can then be used as a slice to query a larger dataset to identify other similar slices having that event for use in generating a tailored data set for use in training another ML model.

Embodiments herein also provide for automatic tuning of thresholds of a slice. In one embodiment, the slices generated by the above approaches (event-based and/or model performance-based) can be adjusted to improve the performance (e.g., precision and/or recall) of a data miner in identifying other slices that are a positive match to the input slice. For example, different approaches may be implemented to optimize the threshold values of the attributes and metrics of the slice(s) to optimize coverage of targets as well as optimize for reducing density (e.g., flagging rate of sample set).

Embodiments herein provide for automatic slice discovery and slice tuning for data mining purposes. Automatic detection and generation of slices improves the data mining process by generating a diverse and well-rounded data set for using training of ML models for the AV. This improves performance of ML models which in turn improves the overall performance of the AV.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discusses embodiments as implemented in an automotive environment, but one skilled in the art will appreciate that embodiments may be implemented in a variety of different environments and use cases. Further details of the automatic slice discovery and slice tuning for data mining in autonomous systems of embodiments herein are further described below with respect to FIGS. 1-8.

FIG. 1 is a block diagram illustrating an example system 100 for automatic slice discovery and slice tuning for data mining in autonomous systems, in accordance with embodiments herein. In one embodiment, system 100 implements a data center platform 105 communicably coupled to an AV 130 for providing the automatic slice discovery and slice tuning for data mining in autonomous systems, as described further herein. The data center platform 105 of FIG. 1 can be, for example, part of a data center that is cloud-based or otherwise. In other examples, the AV 130 can be part of an AV or a human-operated vehicle having an advanced driver assistance system (ADAS) that can utilize various sensors including radar sensors.

In one embodiment, system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system 100 may be part of a platform for managing a fleet of AVs and AV-related services. The platform can include the data center platform 105, which can send and receive various signals to and from an AV 130. These signals can include sensor data captured by the sensor systems of the AV 130, roadside assistance requests, software updates, ridesharing pick-up and drop-off instructions, and so forth. In some examples, the data center platform 105 may also support a ridesharing service, a delivery service, a remote/roadside assistance service, street services (e.g., street mapping, street patrol, street cleaning, street metering, parking reservation, etc.), and the like. In some embodiments, the system 100 may be implemented in the AV itself or may be implemented in a server computing device.

In this example, the system 100 includes a data center platform 105 hosting one or more of a data management platform 110 and an Artificial Intelligence/Machine Learning (AI/ML) platform 120, among other systems, that are communicably coupled to an AV 130.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores collected user data 117 collected, for example, from the user (e.g., as part of setting up a user profile) and/or from operation of one or more AVs. In some embodiments, data store 115 may also include a data mining dataset 119 that stores data that is mined for use in training and/or evaluation of ML models 140.

The AI/ML platform 120 can provide an infrastructure for training and evaluating machine learning algorithms for operating the AV, and other platforms and systems. In one embodiment, the AI/ML platform 120 of system 100 may include an automatic slice discovery component 122, a slice miner 124, a model evaluation and training component 126, and/or a model deployer 128. Using the model evaluation and training component 126, and/or the model deployer 128, data scientists can prepare data sets from the data management platform 110; select, design, and train machine learning models 140; evaluate, refine, and deploy the models 140; maintain, monitor, and retrain the models 140; and so on.

In embodiments herein and as previously discussed, as part of the training and evaluation of ML algorithms for operating the AV, a robust and accurate training data set should be utilized. One aspect of generating a robust and accurate training data set is being able to identify and include in the training data set targeted cases that can address weaknesses of the ML models. Data mining techniques can be utilized to identify those targeted cases. Within the field of data mining, slices can be mined to aid in tailoring a dataset for precise and targeted training of an ML model. A slice refers to subsets of data having a set of common characteristics, such as a same set of determined attributes. In implementations herein, the attributes may include features and/or metrics corresponding to the AV and a context of the AV during operation. For example, the features and/or metrics can include road agent characteristics, contextual attributes, attributes with respect to the AV, prediction output, ground truth information, uncertainty, distance metrics, trajectory probability, yield/assert data, and so on. A subset of these features/metrics can be combined to define a slice of the dataset of road data used to train and/or evaluate an ML model.

Embodiments herein provide for automatic slice discovery and slice tuning for data mining in autonomous systems, such as AV 130, by implementing an automatic slice discovery component 122 to perform automatic slice discovery and slice tuning to identify one or more slices of AV data that can be used for mining of slices by slice miners 124. In one embodiment, the automatic slice discovery component 122 may implement a variety of approaches for slice discovery and slice tuning.

In one approach, the automatic slice discovery component 122 implements event-based automatic slice discovery. In event-based automatic slice discovery, a target scene (event) is identified based on behavior of the AV during operation. The target scene may be a failure event of behavior of the AV captured in road data of the AV. For example, the failure event may include events such as "stopping in a bike lane", "being too close to pedestrians", "failed AV lane change", "failed AV unprotected left turn", and so on. There may be multitudes of different road events and observed AV behaviors that can be classified as failure events for purposes of event-based automatic slice discovery herein. In some embodiments, more than one scene may be identified and provided as an example of the failure event.

In embodiments herein, the identified scene(s) associated with the failure event may be provided as an incoming signal to a trained ML model providing slice discovery, also referred to herein as a slice discovery ML model. The trained slice discovery ML model may process the incoming signal of the target scene(s) in order to identify a set of attributes and corresponding thresholds for the values of those attributes that can be utilized as a defined slice for slice mining purposes. The trained slice discovery ML model operates to identify the "event" occurring in the target scene and determine the set of attributes and thresholds used to define that event. The generated slice definition (attributes/thresholds) can then be used by the slice miner 124 to query a larger dataset to identify other similar slices of data having that event for use in generating a tailored data set for use in training another ML model. This tailored data set may be maintained in data mining dataset 119 and utilized by model evaluation and training component 126 to train and/or evaluate an AI/ML model 140 that is deployed to AV 130 by model deployer 128.

In another approach, the automatic slice discovery component 122 implements model performance-based automatic slice discovery. In the model performance-based automatic slice discovery, internal metrics used to evaluate performance of ML models operating on the AV can be utilized to identify whether an anomaly is occurring with performance of the ML model. The ML model being assessed may be, for example, a prediction model, a trajectory planning model, a perception model, a localization model, and so on. The identified anomaly of the ML model may not necessarily be reflected in the behavior of the AV, but nevertheless affect the ML model performance.

In one embodiment, when performance metric(s) of the ML model indicate performance of the ML model is falling below a benchmark performance level, a feature space of the ML model that exists when the ML model performance triggers the sub-par performance is used as an input to the trained slice discovery ML model. In one embodiment, the trained slice discovery ML model used for model performance-based automatic slice discovery may be different than the trained slice discovery ML model used for event-based automatic slice discovery. The automatic slice discovery component 122 utilizes the trained slice discovery ML model to predict errors in ML models associated with that input feature space, and identify a set of attributes and corresponding thresholds associated with an event associated with the predicted error. Those sets of attributes/thresholds can then be used as a slice that is provided to slice miner 124 to query a larger dataset to identify other similar slices having that event. These other similar slices are combined as a tailored data set, which may be maintained in data mining dataset 119 and utilized by model evaluation and training component 126 to train and/or evaluate an AI/ML model 140 that is deployed to AV 130 by model deployer 128.

In some embodiments, the automatic slice discovery component 122 may also provide for automatic tuning of thresholds of a slice. In one embodiment, the slices identified by the automatic slice discovery component 122 (e.g., using he event-based and/or model performance-based approaches discussed above) can be adjusted ("tuned") to improve the performance (e.g., precision and/or recall) of the slice miner 124 in identifying other slices that are a positive match to the input slice. For example, different approaches may be implemented to optimize (tune) the threshold values of the attributes of the slice(s) to optimize coverage of targets and/or optimize for reducing density (e.g., flagging rate of sample set).

Further details of the automatic slice discovery and slice tuning for data mining in autonomous systems are provided below with respect to FIGS. 2-8.

Figure 2:
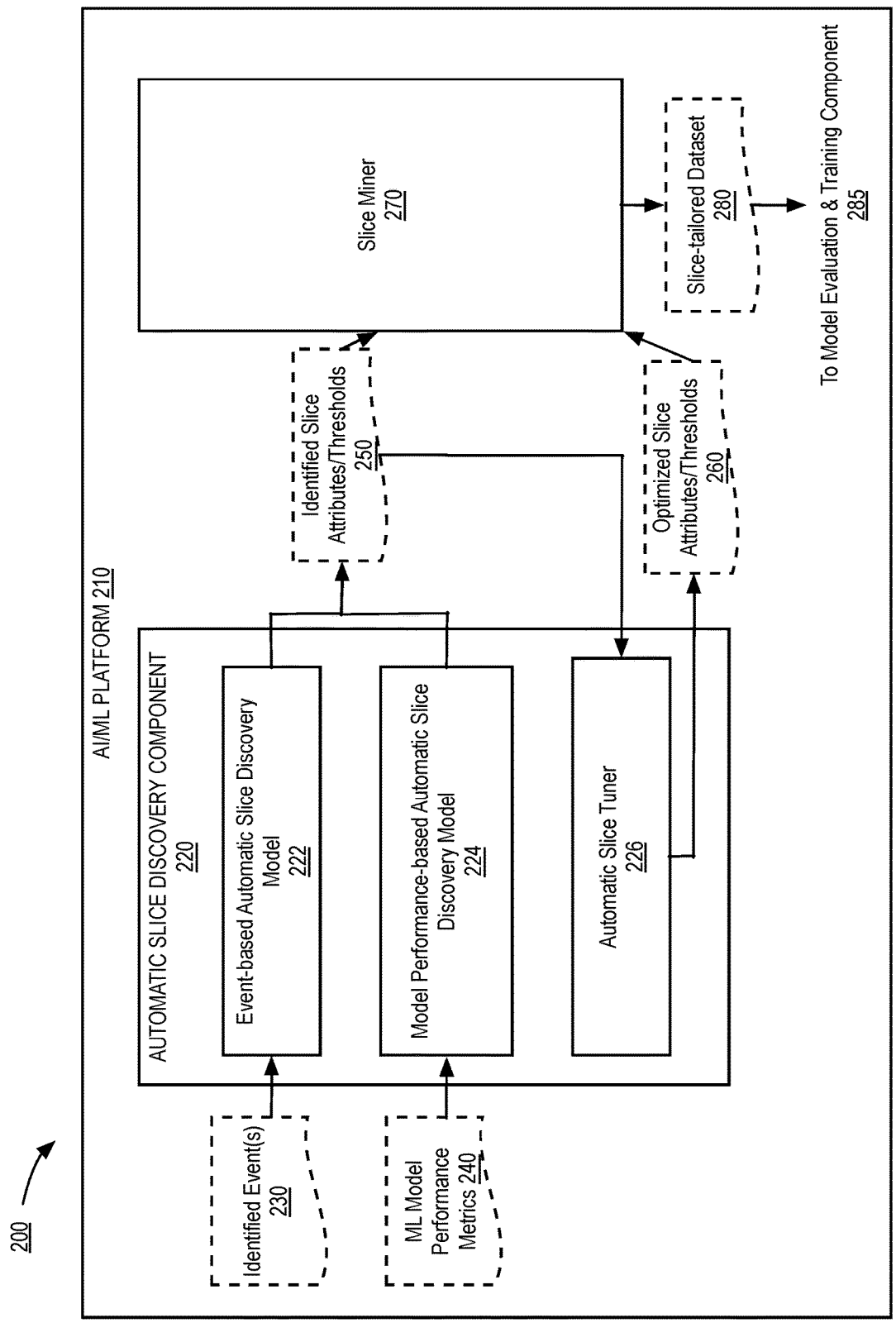
FIG. 2 is a block diagram of an artificial intelligence (AI)/machine learning (ML) platform in a datacenter implementing automatic slice discovery and slice tuning for data mining, in accordance with embodiments herein.

FIG. 2 is a block diagram of an AI/ML platform 210 in a datacenter 200 implementing automatic slice discovery and slice tuning for data mining, in accordance with embodiments herein. In one embodiment, AI/ML platform 210 is the same as AI/ML platform 120 described with respect to FIG. 1. AI/ML platform 210 may include an automatic slice discovery component 220 and a slice miner 270. In one embodiment, automatic slice discovery component is the same as automatic slice discovery component 122 described with respect to FIG. 1, and slice miner 270 is the same as slice miner 124 described with respect to FIG. 1. Automatic slice discovery component 220 may include an event-based automatic slice discovery model 222, a model performance-based slice discovery model 224, and an automatic slice tuner 226.

In one embodiment, the automatic slice discovery component 220 may utilize a trained ML model, such as event-based automatic slice discovery model 222, to implement based automatic slice discovery. In event-based automatic slice discovery, the automatic slice discovery component 220 may receive one or more examples of "road events" of AV(s) and convert those events into a slice to utilize for data mining (e.g., slice mining). In one embodiment, this may include a single event, or it may include sets of highly-related events. In particular, event-based automatic slice discovery enables the use of "failure events" as input in order to generate a slice as output to better capture a specific scenario. As such, event-based automatic slice discovery is implemented to discover slices that cover specific events or sets of related events.

In event-based automatic slice discovery a target scene ("event"), depicted as identified event(s) 230, from road data of an AV is identified. The identified event(s) 230 may be a failure event of behavior of the AV captured in road data of the AV. For example, the failure event may include events such as "stopping in a bike lane", "being too close to pedestrians", "failed AV lane change", "failed AV unprotected left turn", "red light creeping", and so on. There may be multitudes of different road events and observed AV behaviors that can be classified as failure events for purposes of event-based automatic slice discovery herein. In some embodiments, more than one scene from more than one AV may be identified and provided as an example of the failure event. In some embodiments, the identified event(s) 230 may be sourced from, for example, the output of diagnostic tools, which provide a process to identify abnormal behavior and/or safety events on-road. In some embodiments, the identified event(s) 230 may be sourced from data mining outputs.

In embodiments herein, the identified event(s) 230 may be provided as an incoming signal to the event-based automatic slice discovery model 222. The event-based automatic slice discovery model 222 operates to identify the "event" occurring in the identified event(s) 230 and determine the set of attributes and thresholds 250 used to define that event. This set of identified slice attributes and corresponding thresholds 250 defines a slice definition. In one embodiment, the event-based automatic slice discovery model 222 may be implemented as a classification model. To formulate (e.g., train) the classification model of event-based automatic slice discovery model 222, the positive labels can be sourced by the failure events and the negative labels are sampled randomly from road data. In one embodiment, a random forest learning method can be used to search for the optimal attribute combinations as the classifier. The random forest learning method is an ensemble learning method for classification, regression, and other tasks that operates by constructing a multitude of decision trees at training time. For classification tasks, the output of the random forest is the class selected by most trees. In one embodiment, the random forest learning method trains a gradient-boosted tree as a binary classifier, where positive examples are ticks around events and negative examples are all other ticks (a random uniform sample).

In some embodiments, automatic slice discovery component 220 may access a set of possible attributes that the event-based automatic slice discovery model 222 can utilize when identifying the attributes and thresholds for an identified event(s) 230. The attribute selection strategy implemented by the event-based automatic slice discovery model 222 may utilize different approaches for attribute selection. In one example, the attributes may be pre-selected. This means that the attribute selection is narrowed down to a subset of attributes based on human input and/or domain expertise. For example, for the "red light creeping" identified event 230, the slice may be indicated to include attributes for traffic light status, AV velocity, and AV distance to the stop line. The event-based automatic slice discovery model 222 can then be used to find the optimal thresholds of the attributes. This approach is similar to the automatic slice tuning described further below. In another example, the attribute selection can be deferred to the event-based automatic slice discovery model 222. In a further example, a hybrid mode may be implemented where the domain expertise may be expressed as preset attributes, and the event-based automatic slice discovery mode 222 can add additional attributes if needed.

The generated slice definition 240 (e.g., attributes/thresholds) can then be used by the slice miner 270 to query a larger dataset to identify other similar slices of data having that event for use in generating a slice-tailored dataset 280 for use in training another ML model, such as at model evaluation and training component 285 (which may be the same as model evaluation and training component 126 of FIG. 1). In one embodiment, the slice miner 270 may run SQL queries over a larger dataset to identify similar slices that have common characteristics (e.g., attributes/threshold) as the input slice. The slice-tailored dataset 280 may be utilized by model evaluation and training component 285 to train and/or evaluate an AI/ML model that is deployed to an AV, for example.

In another approach, the automatic slice discovery component 220 implements model performance-based automatic slice discovery. In the model performance-based automatic slice discovery, ML model performance metrics 240 of an AV ML model are utilized to identify combinations of slice attributes and thresholds 250 that define a slice for mining purposes. The ML mode performance metrics 240 include internal metrics that are used to evaluate performance of ML models operating on the AV and can be utilized to identify whether an anomaly is occurring with performance of the ML model. The AV ML model being assessed may be, for example, a prediction model, a trajectory planning model, a perception model, a localization model, and so on. In some embodiments, the identified anomaly of the AV ML model may not necessarily be reflected in the behavior of the AV, but nevertheless affect the ML model performance.

In embodiments herein, the ML model performance metrics 240 may be provided to model performance-based automatic slice discovery model 224. The model performance-based automatic slice discovery model 224 operates to identify occurrences of the AV ML model performance metrics 240 falling below a benchmark performance level for the AV ML model. This set of performance metrics and their values of the AV ML model may be referred to herein as a metric space of the AV. When this occurs, a feature space of the AV ML model that exists when the ML model performance triggers the sub-par performance is identified and used as an input to the model performance-based automatic slice discovery model 224. The model performance-based automatic slice discovery model 224 uses this input to determine the set of attributes and thresholds 250 used to define that feature space. A feature space may refer to the set of features input to the AV ML model that resulted in the sub-par performance metrics of the AV ML model. The feature space may include all of the attributes and metrics of the AV and/or of the scene context (e.g., other road agents such as other vehicles, bikes, pedestrians, etc.; landmarks; etc.) in which the AV is operating.

In one embodiment, the model performance-based automatic slice discovery model 224 used for the model performance-based automatic slice discovery may be different than the event-based automatic slice discovery model 222 used for event-based automatic slice discovery. The automatic slice discovery component 210 utilizes the model performance-based automatic slice discovery model 224 to predict errors in AV ML models associated with the input feature space, and identify a set of attributes and corresponding thresholds associated with an event corresponding to the predicted error.

In one embodiment, the model performance-based automatic slice discovery model 224 may be implemented as a regression model. To formulate (e.g., train) the regression model of model performance-based automatic slice discovery model 224, a random forest learning method can be used to search for the predict/detect statistically-significant anomalies in performance of an AV ML model. The random forest learning method is an ensemble learning method for classification, regression, and other tasks that operates by constructing a multitude of decision trees at training time. For regression tasks, the mean or average prediction of the individual trees is returned. In one embodiment, the random forest learning method trains a gradient-boosted tree to predict a target performance metric. This allows for identifying scenarios where the AV ML model performance underperforms before these scenarios cause problems on the road (e.g., as a type of proactive data mining approach).

The set of identified attributes/thresholds 250 output by the model performance-based automatic slice discovery model 228 can then be used as a slice that is provided to slice miner 270. Slice miner 270 can use that slice to query a larger dataset to identify other similar slices having that same set of characteristics (attributes/thresholds). In one embodiment, the slice miner 270 may run SQL queries over a larger dataset to identify similar slices that have common characteristics (e.g., attributes/threshold) as the input slice. These other similar slices are combined as a tailored dataset 280, which may be utilized by model evaluation and training component 285 to train and/or evaluate an AI/ML model that is deployed to AV.

In some embodiments, the automatic slice discovery component 220 may also provide for automatic tuning of thresholds of a slice. In one embodiment, the identified slice attributes/thresholds 250 output from either event-based automatic slice discovery model 222 and/or model performance-based automatic slice discovery model 224 can be adjusted or "tuned" by automatic slice tuner 226. This tuning allows for improving the performance (e.g., precision and/or recall) of the slice miner 270 in identifying other slices that are a positive match to the input slice.

In embodiments herein, different approaches may be implemented by the automatic slice tuner 226 to tune the threshold values of the identified slice attributes 250 to optimize coverage of targets and/or optimize for reducing density (e.g., flagging rate of sample set). In one embodiment, a grid search may be implemented to tune the threshold values of the input attributes of the slice. In another embodiment, a cross-entropy method (CEM) may be implemented for tuning the thresholds of the determined attributes. In a further embodiment, a Bayesian optimization may be implemented to improve the speed of tuning the thresholds of the determined attributes.

Figure 3:
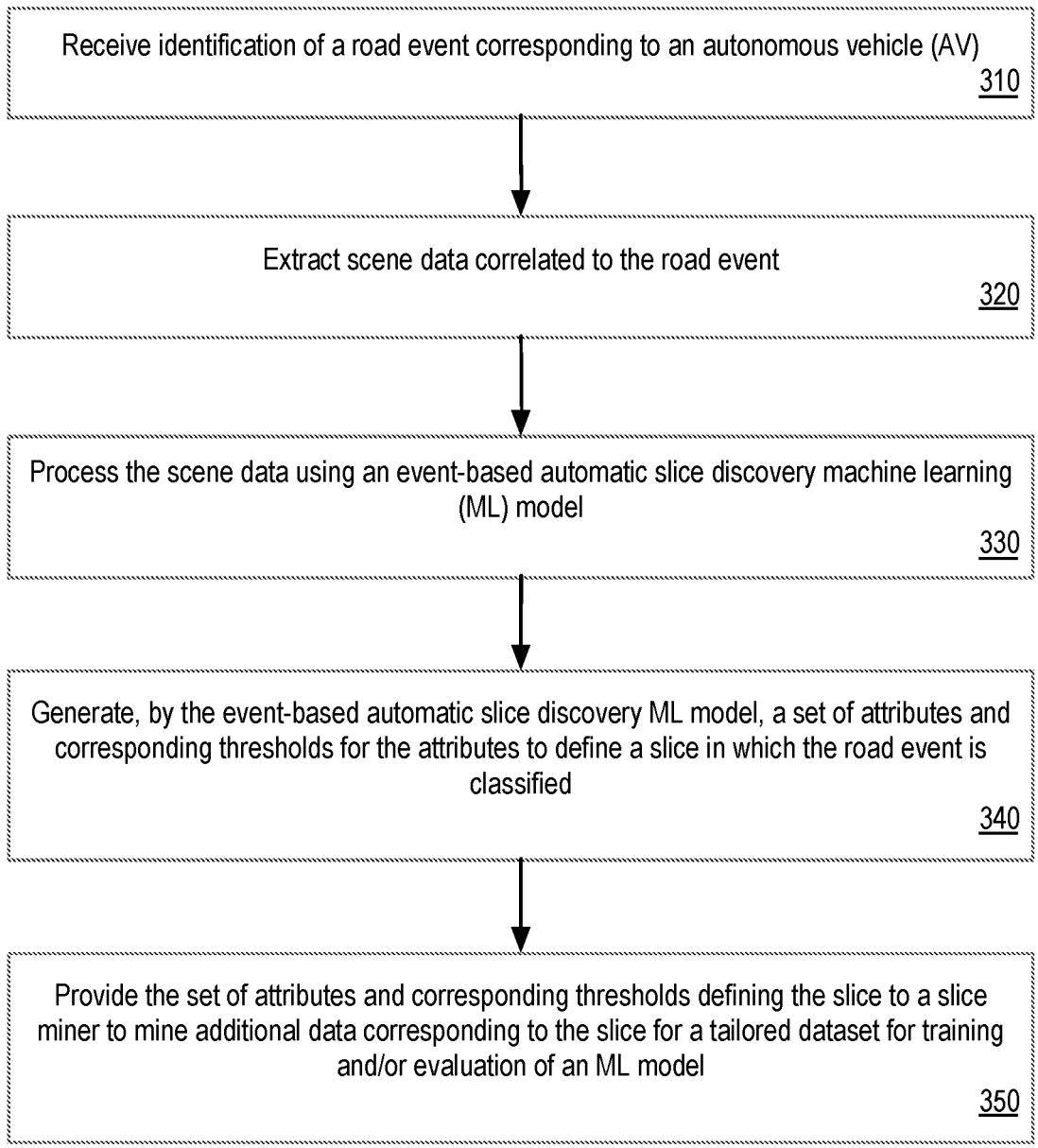
FIG. 3 illustrates an example method implementing event-based automatic slice discovery for data mining in autonomous systems, in accordance with embodiments herein.

FIG. 3 illustrates an example method 300 implementing event-based automatic slice discovery for data mining in autonomous systems, in accordance with embodiments herein. Although the example method 300 depicts a particular sequence of operations, the sequence may be altered without departing from the scope of the disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method 300 includes block 310 where identification of a road event corresponding to an AV is received. In some embodiments, identification of multiple road events corresponding to similar events may be received. At block 320, scene data correlated to the road event is extracted. In one embodiment, the scene data may include features of the AV and the context of the scene.

Subsequently, at block 330, the scene data is processed using an event-based automatic slice discovery ML model. Then, at block 340, the event-based automatic slice discovery ML model generates (or outputs) a set of attributes and corresponding thresholds for the attributes to define a slice in which the road event is classified. Lastly, at block 350, the set of attributes and corresponding thresholds defining the slice is provided to a slice miner to mine additional data corresponding to the slice for a tailored dataset for training and/or evaluation of an ML model.

FIG. 4 illustrates an example method 400 implementing model performance-based automatic slice discovery for data mining in autonomous systems, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where metric data corresponding to performance of an AV ML model is received. In one embodiment, the metric data is received when the metric data underperforms benchmark data corresponding to the AV ML model. Then, at block 420, an AV ML model feature space data corresponding to the metric data is input to a model performance-based automatic slice discovery ML model.

Subsequently, at block 430, the AV ML model feature space data is processed at the model performance-based automatic slice discovery ML model to identify sources of errors in the AV ML model. Then, at block 440, the model performance-based automatic slice discovery ML model generates (outputs) a set of attributes and corresponding thresholds for the attributes to define a slice in which the sources of errors occur. Lastly, at block 450, the set of attributes and corresponding thresholds defining the slice are provided to a slice miner to mine additional data corresponding to the slice for a tailored dataset for training and/or evaluation of the AV ML model.

Figure 5:
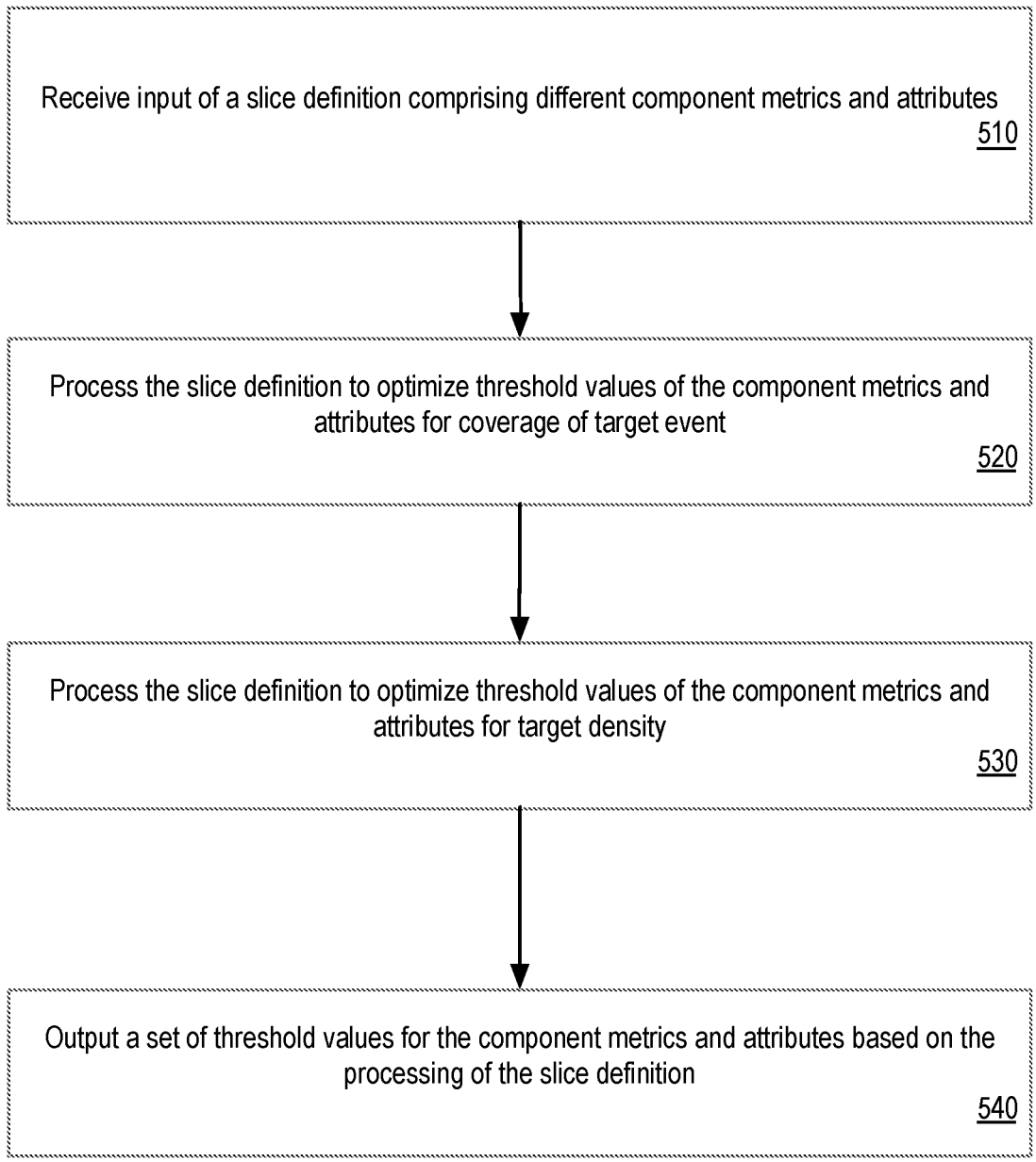
FIG. 5 illustrates an example method for automatic slice tuning for data mining in autonomous systems, in accordance with embodiments herein.

FIG. 5 illustrates an example method 500 for automatic slice tuning for data mining in autonomous systems, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where input of a slice definition comprising different component metrics and attributes is received. In one embodiment, the slice definition is generated by at least one an event-based automatic slice discovery ML model or a model performance-based automatic slice discovery model.

Then, at block 520, the slice definition is processed to optimize threshold values of the component metrics and attributes for coverage of a target event. Subsequently, at block 530, the slice definition is processed to optimize threshold values of the component metrics and attributes for target density. Lastly, at block 540, output a set of threshold values for the component metrics and attributes based on the processing of the slice definition.

Figure 6:
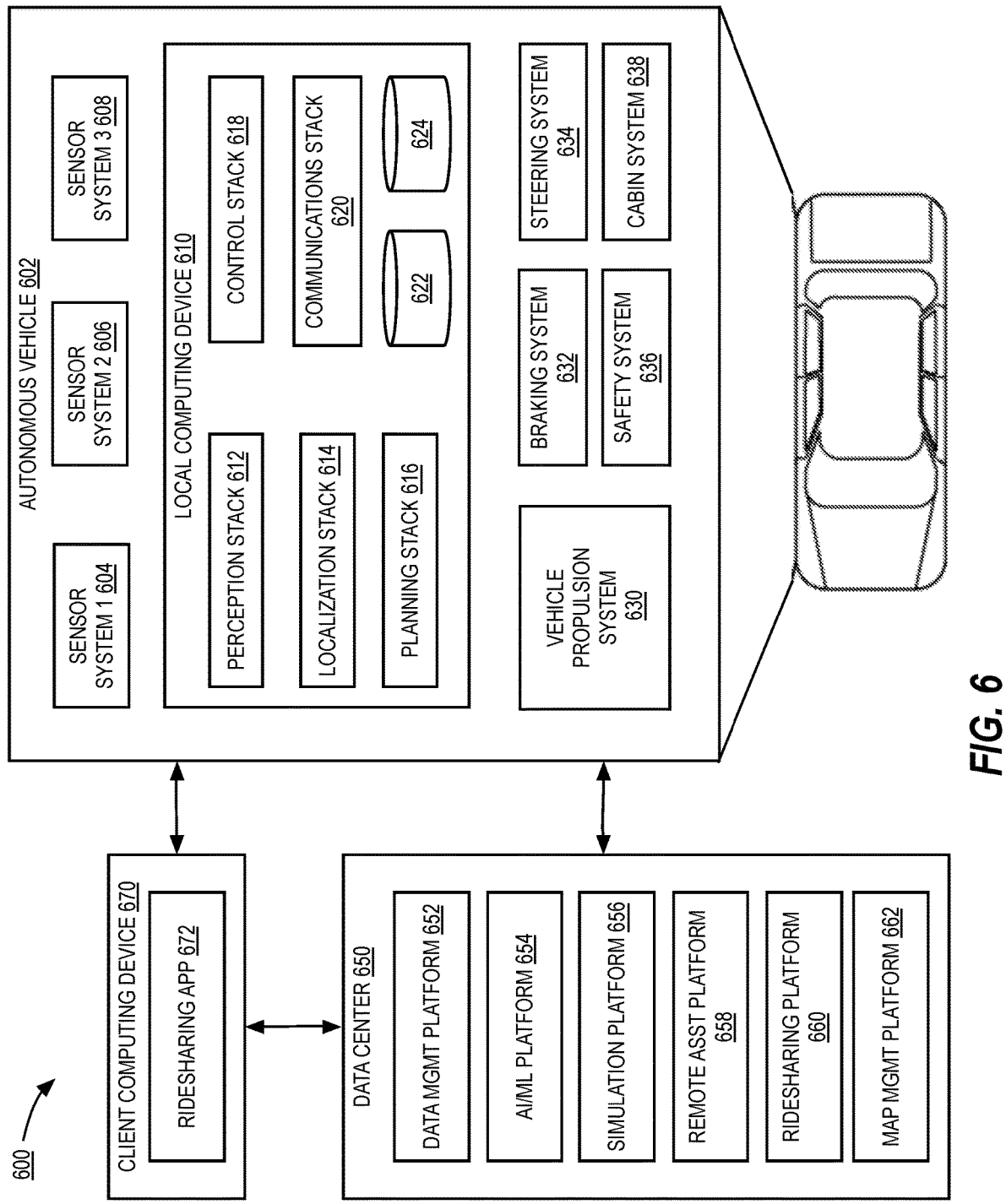
FIG. 6 illustrates an example system environment that can be used to facilitate AV dispatch and operations, according to some aspects of the disclosed technology.

Turning now to FIG. 6, this figure illustrates an example of an AV management system 600. In one embodiment, the AV management system 600 can implement automatic slice discovery and slice tuning for data mining in autonomous systems, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
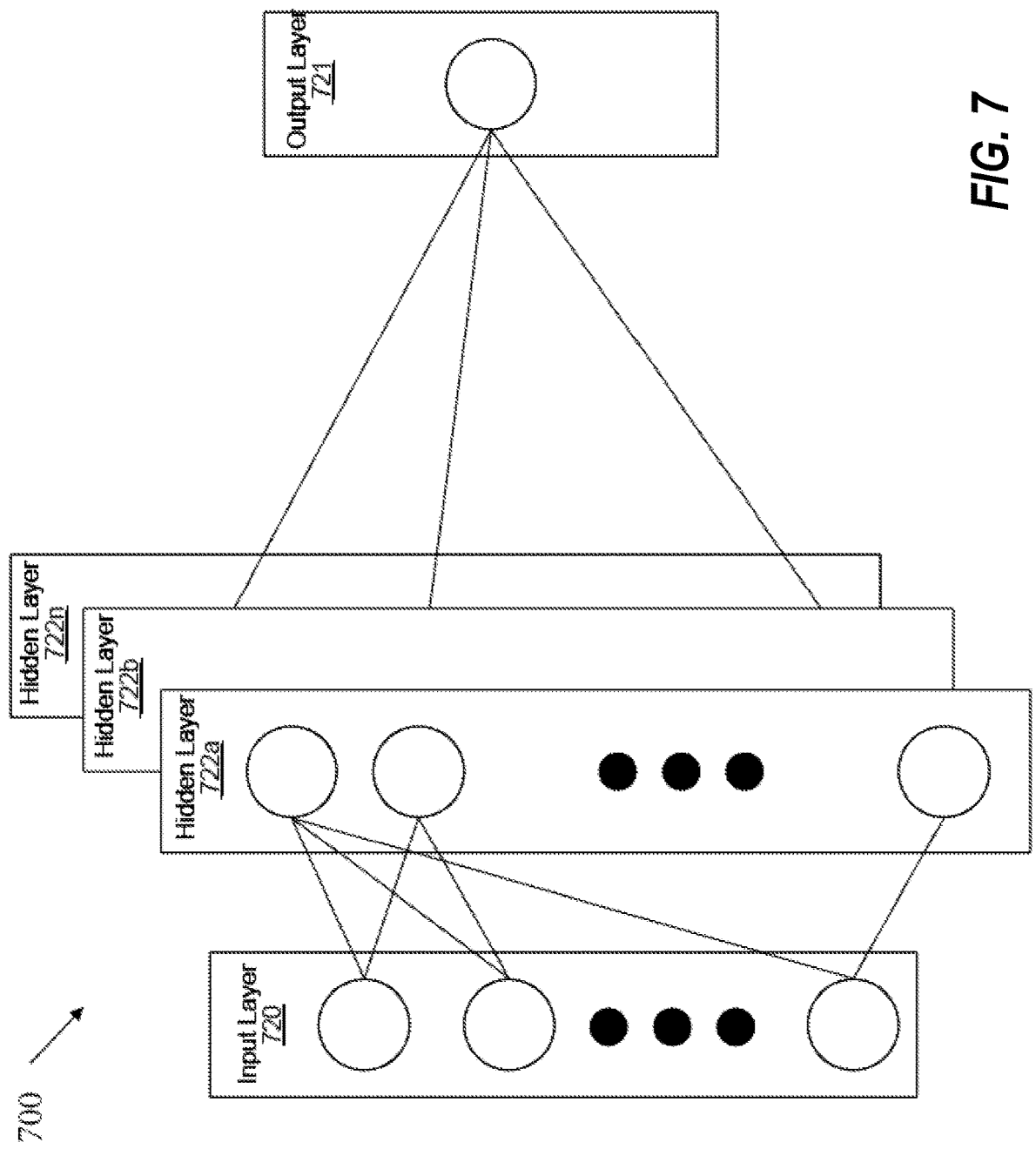
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722*a*, 722*b*, through 722*n*. The hidden layers 722*a*, 722*b*, through 722*n* include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722*a*, 722*b*, through 722*n*. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722*a*. For example, as shown, each of the input nodes of the input layer 720 is connected to each of the nodes of the first hidden layer 722*a*. The nodes of the first hidden layer 722*a* can transform the information of each input node by applying activation functions to the input node information. The information derived from the transformation can then be passed to and can activate the nodes of the next hidden layer 722*b*, which can perform their own designated functions. Example functions include convolutional, up-sampling, data transformation, and/or any other suitable functions. The output of the hidden layer 722*b* can then activate nodes of the next hidden layer, and so on. The output of the last hidden layer 722*n* can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722*a*, 722*b*, through 722*n* in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $$E\_total = \sum \left(\frac{1}{2}(\text{target} - \text{output})^2\right).$$

The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
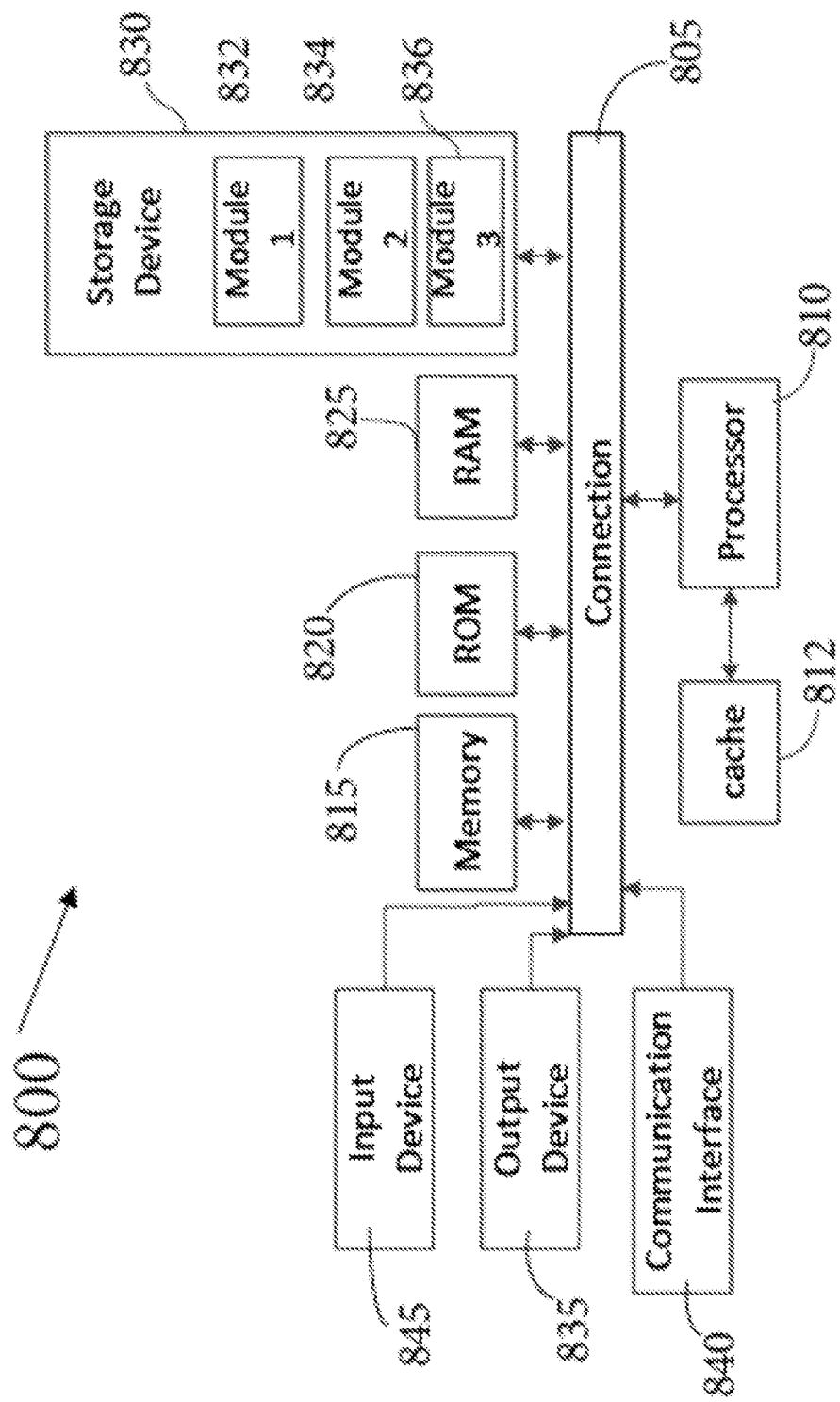
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM)

optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a computer-implemented method for facilitating automatic slice discovery and slice tuning for data mining in autonomous systems, where the method comprises: providing, by a processing device hosting a slice discovery machine learning (ML) model, input data to the slice discovery ML model, the input data corresponding to performance data of an autonomous vehicle (AV); identifying, by the slice discovery ML model, attributes of the AV and corresponding thresholds for the attributes that define a slice comprising a collection of data sharing common characteristics; and providing, by the slice discovery ML model, the attributes and the corresponding thresholds defining the slice to a slice miner to mine training data corresponding to the slice for a tailored dataset.

In Example 2, the subject matter of Example 1 can optionally include wherein the input data comprises at least one failure event of the AV, the failure event is part of road data collected during operation of the AV. In Example 3, the subject matter of any one of Examples 1-2 can optionally include wherein the input data comprises model performance metric data of an AV ML model used for operation of the AV, wherein the model performance metric data underperforms a benchmark for the AV ML model. In Example 4, the subject matter of any one of Examples 1-3 can optionally include wherein the input data comprises a feature space of the AV ML model, and wherein the feature space comprises a set of attributes and metrics of at least one of the AV or a scene context in which the AV is operating.

In Example 5, the subject matter of any one of Examples 1-4 can optionally include wherein the input data comprises a metric space of the AV ML model. In Example 6, the subject matter of any one of Examples 1-5 can optionally include wherein the tailored data set is utilized for at least one of training or evaluation of an AV ML model used for operation of the AV. In Example 7, the subject matter of any one of Examples 1-6 can optionally include wherein the slice discovery ML model comprises a random decision forest ensemble learning model.

In Example 8, the subject matter of any one of Examples 1-7 can optionally include further comprising: receiving input of the slice comprising the attributes and the corresponding thresholds; processing the slice to tune the thresholds to optimize for at least one of coverage of a target event or for a target density; and outputting a set of updated thresholds for the attributes based on the processing of the slice. In Example 9, the subject matter of any one of Examples 1-8 can optionally include wherein the processing of the slice further comprises at least one of utilizing a grid search process to tune the thresholds, utilizing a cross-entropy method to tune the thresholds, or implementing Bayesian optimization to tune the thresholds.

Example 10 includes an apparatus for facilitating automatic slice discovery and slice tuning for data mining in autonomous systems, the apparatus of Example 10 comprising one or more hardware processors to: provide input data to a slice discovery machine learning (ML) model, wherein the input data corresponding to performance data of an autonomous vehicle (AV); identify, by the slice discovery ML model, attributes of the AV and corresponding thresholds for the attributes that define a slice comprising a collection of data sharing common characteristics; and provide, by the slice discovery ML model, the attributes and the corresponding thresholds defining the slice to a slice miner to mine training data corresponding to the slice for a tailored dataset.

In Example 11, the subject matter of Example 10 can optionally include wherein the input data comprises at least one failure event of the AV, the failure event is part of road data collected during operation of the AV. In Example 12, the subject matter of Examples 10-11 can optionally include wherein the input data comprises model performance metric data of an AV ML model used for operation of the AV, wherein the model performance metric data underperforms a benchmark for the AV ML model. In Example 13, the subject matter of Examples 10-12 can optionally include wherein the tailored data set is utilized for at least one of training or evaluation of an AV ML model used for operation of the AV.

In Example 14, the subject matter of Examples 10-13 can optionally include wherein the slice discovery ML model comprises a random decision forest ensemble learning model. In Example 15, the subject matter of Examples 10-14 can optionally include wherein the one or more hardware processors are further to: receive input of the slice comprising the attributes and the corresponding thresholds; process the slice to tune the thresholds to optimize for at least one of coverage of a target event or for a target density; and output a set of updated thresholds for the attributes based on the processing of the slice.

Example 16 is a non-transitory computer-readable storage medium for facilitating automatic slice discovery and slice tuning for data mining in autonomous systems. The non-transitory computer-readable storage medium of Example 16 having stored thereon executable computer program instructions that, when executed by one or more processors, cause the one or more processors to: provide input data to a slice discovery machine learning (ML) model, wherein the input data corresponding to performance data of an autonomous vehicle (AV); identify, by the slice discovery ML model, attributes of the AV and corresponding thresholds for the attributes that define a slice comprising a collection of data sharing common characteristics; and provide, by the slice discovery ML model, the attributes and the corresponding thresholds defining the slice to a slice miner to mine training data corresponding to the slice for a tailored dataset.

In Example 17, the subject matter of Example 16 can optionally include wherein the input data comprises at least one failure event of the AV, the failure event is part of road data collected during operation of the AV. In Example 18, the subject matter of Examples 16-17 can optionally include wherein the input data comprises model performance metric data of an AV ML model used for operation of the AV, wherein the model performance metric data underperforms a benchmark for the AV ML model.

In Example 19, the subject matter of Examples 16-18 can optionally include wherein the slice discovery ML model comprises a random decision forest ensemble learning model. In Example 20, the subject matter of Examples 16-19 can optionally include wherein the one or more hardware processors are further to: receive input of the slice comprising the attributes and the corresponding thresholds; process the slice to tune the thresholds to optimize for at least one of coverage of a target event or for a target density; and output a set of updated thresholds for the attributes based on the processing of the slice.

Example 21 is a system for facilitating automatic slice discovery and slice tuning for data mining in autonomous systems. The system of Example 21 can optionally include a memory to store a block of data, and one or more hardware processors to: provide input data to a slice discovery machine learning (ML) model, wherein the input data corresponding to performance data of an autonomous vehicle (AV); identify, by the slice discovery ML model, attributes of the AV and corresponding thresholds for the attributes that define a slice comprising a collection of data sharing common characteristics; and provide, by the slice discovery ML model, the attributes and the corresponding thresholds defining the slice to a slice miner to mine training data corresponding to the slice for a tailored dataset.

In Example 22, the subject matter of Example 21 can optionally include wherein the input data comprises at least one failure event of the AV, the failure event is part of road data collected during operation of the AV. In Example 23, the subject matter of Examples 21-22 can optionally include wherein the input data comprises model performance metric data of an AV ML model used for operation of the AV, wherein the model performance metric data underperforms a benchmark for the AV ML model. In Example 24, the subject matter of Examples 21-23 can optionally include wherein the tailored data set is utilized for at least one of training or evaluation of an AV ML model used for operation of the AV.

In Example 25, the subject matter of Examples 21-24 can optionally include wherein the slice discovery ML model comprises a random decision forest ensemble learning model. In Example 26, the subject matter of Examples 21-25 can optionally include wherein the one or more hardware processors are further to: receive input of the slice comprising the attributes and the corresponding thresholds; process the slice to tune the thresholds to optimize for at least one of coverage of a target event or for a target density; and output a set of updated thresholds for the attributes based on the processing of the slice.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating automatic slice discovery and slice tuning for data mining in autonomous systems, configured to perform the method of any one of Examples 1-9. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
  providing, by a processing device hosting a slice discovery machine learning (ML) model, input data to the slice discovery ML model, the input data including a first set of data corresponding to performance data of an autonomous vehicle (AV) and a second set of data corresponding to a scene in which the AV is operating;

identifying, by the slice discovery ML model, attributes of the AV and corresponding thresholds for the attributes that define a slice comprising a collection of data sharing common characteristics;

providing, by the slice discovery ML model, the attributes and the corresponding thresholds defining the slice to a slice miner to mine training data corresponding to the slice for a tailored dataset;

wherein the slice discovery ML model includes an event-based automatic slice discovery model and a model performance-based automatic slice discovery model;

wherein identifying, by the slice discovery ML model, attributes of the AV and corresponding thresholds for the attributes that define a slice includes receiving an identification of a road event and processing at least the second set of data using the event-based automatic slice discovery model; and wherein identifying, by the slice discovery ML attributes of the AV and corresponding thresholds for the attributes that define a slice includes processing at least the first set of data using the model performance-based automatic slice discovery model.

2. The computer-implemented method of claim 1, wherein the input data comprises at least one failure event of the AV, the failure event is part of road data collected during operation of the AV.

3. The computer-implemented method of claim 1, wherein the input data comprises model performance metric data of an AV ML model used for operation of the AV, wherein the model performance metric data underperforms a benchmark for the AV ML model.

4. The computer-implemented method of claim 3, wherein the input data comprises a feature space of the AV ML model, and wherein the feature space comprises a set of attributes and metrics of at least one of the AV or a scene context in which the AV is operating.

5. The computer-implemented method of claim 3, wherein the input data comprises a metric space of the AV ML model, and wherein the metric space comprises a set of performance metrics and corresponding values of the AV ML model.

6. The computer-implemented method of claim 1, wherein the tailored data set is utilized for at least one of training or evaluation of an AV ML model used for operation of the AV.

7. The computer-implemented method of claim 1, wherein the slice discovery ML model comprises a random decision forest ensemble learning model.

8. The computer-implemented method of claim 1, further comprising:
receiving input of the slice comprising the attributes and the corresponding thresholds;
processing the slice to tune the thresholds to optimize for at least one of coverage of a target event or for a target density; and
outputting a set of updated thresholds for the attributes based on the processing of the slice.

9. The computer-implemented method of claim 8, wherein the processing of the slice further comprises at least one of utilizing a grid search process to tune the thresholds, utilizing a cross-entropy method to tune the thresholds, or implementing Bayesian optimization to tune the thresholds.

10. An apparatus comprising:
one or more hardware processors to:
provide input data to a slice discovery machine learning (ML) model, wherein the input data including a first set of data corresponding to performance data of an autonomous vehicle (AV) and a second set of data corresponding to a scene in which the AV is operating;
identify, by the slice discovery ML model, attributes of the AV and corresponding thresholds for the attributes that define a slice comprising a collection of data sharing common characteristics;
provide, by the slice discovery ML model, the attributes and the corresponding thresholds defining the slice to a slice miner to mine training data corresponding to the slice for a tailored dataset;
wherein the slice discovery ML model includes an event-based automatic slice discovery model and a model performance-based automatic slice discovery model;
wherein identifying, by the slice discovery ML model, attributes of the AV and corresponding thresholds for the attributes that define a slice includes receiving an identification of a road event and processing at least the second set of data using the event-based automatic slice discovery model; and
wherein identifying, by the slice discovery ML attributes of the AV and corresponding thresholds for the attributes that define a slice includes processing at least the first set of data using the model performance-based automatic slice discovery model.

11. The apparatus of claim 10, wherein the input data comprises at least one failure event of the AV, the failure event is part of road data collected during operation of the AV.

12. The apparatus of claim 10, wherein the input data comprises model performance metric data of an AV ML model used for operation of the AV, wherein the model performance metric data underperforms a benchmark for the AV ML model.

13. The apparatus of claim 10, wherein the tailored data set is utilized for at least one of training or evaluation of an AV ML model used for operation of the AV.

14. The apparatus of claim 10, wherein the slice discovery ML model comprises a random decision forest ensemble learning model.

15. The apparatus of claim 10, wherein the one or more hardware processors are further to:
receive input of the slice comprising the attributes and the corresponding thresholds;
process the slice to tune the thresholds to optimize for at least one of coverage of a target event or for a target density; and
output a set of updated thresholds for the attributes based on the processing of the slice.

16. A non-transitory computer-readable medium having stored thereon instructions that, when executed by one or more processors, cause the one or more processors to:
provide input data to a slice discovery machine learning (ML) model, wherein the input data including a first set of data corresponding to performance data of an autonomous vehicle (AV) and a second set of data corresponding to a scene in which the AV is operating;
identify, by the slice discovery ML model, attributes of the AV and corresponding thresholds for the attributes that define a slice comprising a collection of data sharing common characteristics;

provide, by the slice discovery ML model, the attributes and the corresponding thresholds defining the slice to a slice miner to mine training data corresponding to the slice for a tailored dataset;

wherein the slice discovery ML model includes an event-based automatic slice discovery model and a model performance-based automatic slice discovery model;

wherein identifying, by the slice discovery ML model, attributes of the AV and corresponding thresholds for the attributes that define a slice includes receiving an identification of a road event and processing at least the second set of data using the event-based automatic slice discovery model; and wherein identifying, by the slice discovery ML attributes of the AV and corresponding thresholds for the attributes that define a slice includes processing at least the first set of data using the model performance-based automatic slice discovery model.

17. The non-transitory computer-readable medium of claim 16, wherein the input data comprises at least one failure event of the AV, the failure event is part of road data collected during operation of the AV.

18. The non-transitory computer-readable medium of claim 16, wherein the input data comprises model performance metric data of an AV ML model used for operation of the AV, wherein the model performance metric data underperforms a benchmark for the AV ML model.

19. The non-transitory computer-readable medium of claim 16, wherein the slice discovery ML model comprises a random decision forest ensemble learning model.

20. The non-transitory computer-readable medium of claim 16, wherein the one or more hardware processors are further to:

receive input of the slice comprising the attributes and the corresponding thresholds;

process the slice to tune the thresholds to optimize for at least one of coverage of a target event or for a target density; and output a set of updated thresholds for the attributes based on the processing of the slice.

* * * * *